(12) United States Patent
Sono et al.

(10) Patent No.: US 10,766,540 B2
(45) Date of Patent: Sep. 8, 2020

(54) ROCKER STRUCTURE

(71) Applicant: TOYOTA JIDOSHA KABUSHIKI KAISHA, Toyota-shi (JP)

(72) Inventors: Tomohito Sono, Okazaki (JP); Yuuki Mukaigawa, Seto (JP); Kosho Kawahara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 90 days.

(21) Appl. No.: 16/265,415

(22) Filed: Feb. 1, 2019

(65) Prior Publication Data
US 2019/0248418 A1 Aug. 15, 2019

(30) Foreign Application Priority Data

Feb. 13, 2018 (JP) .................................. 2018-022973

(51) Int. Cl.
*B62D 25/02* (2006.01)
*B62D 21/15* (2006.01)
*B62D 29/00* (2006.01)

(52) U.S. Cl.
CPC .......... *B62D 25/025* (2013.01); *B62D 21/15* (2013.01); *B62D 21/157* (2013.01); *B62D 29/008* (2013.01)

(58) Field of Classification Search
CPC .... B62D 25/025; B62D 29/008; B62D 21/15; B62D 21/157; B62D 25/20
USPC ............ 296/187.12, 209, 203.03, 30, 193.05
See application file for complete search history.

(56) References Cited

U.S. PATENT DOCUMENTS

| | | | | |
|---|---|---|---|---|
| 5,340,178 | A | * | 8/1994 | Stewart .................... B60R 19/18 293/122 |
| 5,613,727 | A | * | 3/1997 | Yamazaki .............. B62D 25/02 296/187.12 |
| 8,011,721 | B2 | * | 9/2011 | Yamada ................. B62D 25/02 296/209 |
| 10,035,544 | B2 | * | 7/2018 | Lee ....................... B62D 25/025 |
| 10,494,030 | B1 | * | 12/2019 | Paramasivam .......... B60K 1/04 |
| 10,633,029 | B1 | * | 4/2020 | Nusier .................. B62D 21/04 |
| 2013/0088044 | A1 | * | 4/2013 | Charbonneau ....... B62D 21/157 296/187.12 |

(Continued)

FOREIGN PATENT DOCUMENTS

JP 2008-100548 5/2008

*Primary Examiner* — Jason S Morrow
*Assistant Examiner* — E Turner Hicks
(74) *Attorney, Agent, or Firm* — Oblon, McClelland, Maier & Neustadt, L.L.P.

(57) ABSTRACT

A rocker structure includes a closed cross-sectional part that extends along a vehicle front-rear direction on the outer side of a floor panel of a vehicle in a vehicle width direction, a horizontal plate, and a first vertical plate. The closed cross-sectional part includes an outer wall, an inner wall, a lower wall, and an upper wall. The horizontal plate has a ridge and a valley, and is propped along the vehicle width direction between the outer wall and the inner wall, and the ridge and the valley are provided alternately along the vehicle width direction. The ridge protrudes upward in the vehicle-height direction, and the valley is depressed downward in the vehicle-height direction. The first vertical plate is propped along the vehicle-height direction between the horizontal plate and one of the lower wall and the upper wall.

18 Claims, 12 Drawing Sheets

(56) References Cited

U.S. PATENT DOCUMENTS

2017/0144706 A1* 5/2017 Bach .................... B62D 25/025
2019/0232903 A1* 8/2019 Newcomb ............. B60R 19/023

* cited by examiner

ROCKER STRUCTURE

INCORPORATION BY REFERENCE

The disclosure of Japanese Patent Application No. 2018-022973 filed on Feb. 13, 2018 including the specification, drawings and abstract is incorporated herein by reference in its entirety.

BACKGROUND

1. Technical Field

The present disclosure relates to a rocker structure.

2. Description of Related Art

U.S. Ser. No. 13/008,8044 A discloses a technique related to a rocker that shows a closed cross-sectional part when cut along a vehicle width direction. This technique features a plate member having an X-shaped cross-section that is provided inside the closed cross-sectional part. According to this related art, in the event of a lateral collision of a vehicle, the collision energy can be absorbed as the plate member becomes folded (undergoes buckling deformation).

SUMMARY

As described above, in the related art, collision energy can be absorbed as the X-shaped plate member undergoes buckling deformation by becoming folded. However, allowing the plate member to undergo buckling deformation easily so as to stabilize the buckling deformation of the plate member may result in a reduced absorption amount of collision energy. Thus, there is room for improvement in terms of stabilizing buckling deformation and increasing the absorption amount of collision energy at the same time.

The present disclosure provides a rocker structure that can stabilize buckling deformation and increase the absorption amount of collision energy.

A first aspect of the present disclosure is a rocker structure. The rocker structure includes a closed cross-sectional part that extends along a vehicle front-rear direction on the outer side of a floor panel of a vehicle in a vehicle width direction, a horizontal plate, and a first vertical plate. The closed cross-sectional part includes an outer wall located on the outer side of the closed cross-sectional part in the vehicle width direction, an inner wall located on the inner side of the closed cross-sectional part in the vehicle width direction, a lower wall located on the lower side of the closed cross-sectional part in a vehicle height direction, and an upper wall located on the upper side of the closed cross-sectional part in the vehicle-height direction. The horizontal plate has a ridge and a valley and is provided inside the closed cross-sectional part so as to be propped along the vehicle width direction between the outer wall and the inner wall, and the ridge and the valley are provided alternately along the vehicle width direction. The ridge protrudes upward in the vehicle-height direction, and the valley is depressed downward in the vehicle-height direction. The first vertical plate is provided inside the closed cross-sectional part so as to be propped along the vehicle-height direction between the horizontal plate and one of the lower wall and the upper wall.

In the first aspect, the horizontal plate propped between the outer wall and the inner wall of the rocker is provided inside the closed cross-sectional part of the rocker. Thus, compared with when this horizontal plate is not provided, the rigidity of the rocker can be enhanced and deformation of the rocker can be suppressed.

In a lateral collision of the vehicle, the collision energy is absorbed as the rocker undergoes plastic deformation (buckling deformation). In the first aspect, the horizontal plate has the ridge protruding upward in the vehicle-height direction and the valley depressed downward in the vehicle-height direction that are provided alternately along the vehicle width direction.

In a lateral collision of the vehicle, therefore, the horizontal plate undergoes buckling deformation with those ridge and valley forming starting points of the deformation. As a result, the horizontal plate becomes folded along the vehicle width direction and thus the deformation mode is controlled. This means that the buckling deformation of the horizontal plate is stabilized and the collision energy absorption efficiency can be increased.

In the first aspect, the first vertical plate is provided inside the closed cross-sectional part so as to be propped along the vehicle-height direction between the horizontal plate and one of the lower wall and the upper wall that are located respectively on the lower side and the upper side of the closed cross-sectional part in the vehicle-height direction. Thus, the horizontal plate is reinforced and wobbling thereof in the vehicle-height direction is suppressed.

Thus, in the first aspect, it is possible to enhance the rigidity of the rocker and suppress deformation of the rocker compared with when the first vertical plate is not provided. As a result, in the first aspect, the load-carrying capacity of the rocker can be increased.

In the first aspect, it is possible to increase the collision energy absorption efficiency by stabilizing buckling deformation of the rocker, as well as to increase the amount of collision energy absorbed as the rocker undergoes buckling deformation by increasing the load-carrying capacity of the rocker.

Thus, the first aspect has an excellent advantage of being able to stabilize buckling deformation and increase the absorption amount of collision energy.

The feature that "the ridge and the valley are provided alternately along the vehicle width direction" in the first aspect may be such that the ridge and the valley are provided continuously and alternately along the vehicle width direction or that the ridge and the valley are provided discontinuously and alternately.

In the first aspect, the rocker structure may include a second vertical plate. The second vertical plate may be propped along the vehicle-height direction between the horizontal plate and the other one of the lower wall and the upper wall, at a position at which the second vertical plate does not coincide with the first vertical plate in the vehicle width direction as seen in a plan view of the horizontal plate.

In this configuration, the horizontal plate is further reinforced by the second vertical plate, in addition to the first vertical plate, being propped between the horizontal plate and the other one of the lower wall and the upper wall of the rocker. Compared with when the second vertical plate is not provided, the rigidity of the rocker can be enhanced and deformation of the rocker can be suppressed. Thus, it is possible to increase the load-carrying capacity of the rocker and increase the amount of collision energy absorbed as the rocker undergoes buckling deformation.

In the above configuration, the second vertical plate is provided at a position at which the second vertical plate does not coincide with the first vertical plate in the vehicle width direction as seen in a plan view of the horizontal plate. Thus, when the horizontal plate undergoes buckling deformation with the ridge and the valley forming starting points of the deformation, the first vertical plate or the second vertical plate does not interfere with the deformation of the horizontal plate.

For example, if the first vertical plate and the second vertical plate are provided at positions at which these plates coincide with each other in the vehicle width direction as seen in a plan view of the horizontal plate, when the horizontal plate undergoes buckling deformation with the ridge and the valley forming starting points of the deformation, the first vertical plate or the second vertical plate may interfere with the deformation of the horizontal plate by exerting tension in the direction of deformation of the horizontal plate. For this reason, in the above configuration, the second vertical plate is placed so as not to coincide with the first vertical plate in the vehicle width direction as seen in a plan view of the horizontal plate as described above.

Thus, with the first vertical plate and the second vertical plate placed so as not to coincide with each other in the vehicle width direction as seen in a plan view of the horizontal plate, the above configuration has an excellent advantage of being able to prevent the first vertical plate or the second vertical plate from interfering with buckling deformation of the horizontal plate when the horizontal plate deforms with the ridge and the valley forming starting points of the deformation.

In the first aspect, the first vertical plate and the second vertical plate may be provided alternately along the vehicle width direction. A first area and a second area may be provided alternately in the horizontal plate along the vehicle width direction, each of the first area and the second area may be an area between a vertex of the ridge and a vertex of the valley adjacent to the vertex of the ridge in the horizontal plate, and the first vertical plate may be provided in the first area and the second vertical plate may be provided in the second area.

In this configuration, the first vertical plate and the second vertical plate are provided alternately along the vehicle width direction, between the vertex of the ridge and the vertex of the valley in the horizontal plate. When the horizontal plate undergoes buckling deformation, the horizontal plate deforms with the vertex of the ridge and the vertex of the valley forming starting points of the deformation. Therefore, the first vertical plate and the second vertical plate are not provided at the vertex of the ridge or the vertex of the valley so as not to interfere with deformation of the horizontal plate.

Thus, the above configuration has an excellent advantage of being able to prevent the first vertical plate and the second vertical plate from interfering with deformation of the horizontal plate by not providing the first vertical plate and the second vertical plate at the vertex of the ridge or the vertex of the valley.

In the first aspect, the horizontal plate may be disposed in the middle of the closed cross-sectional part in the vehicle-height direction.

For example, when the horizontal plate is provided on the lower side of the closed cross-sectional part in the vehicle-height direction, the horizontal plate will be partially left uncrushed if the horizontal plate hits the lower wall of the closed cross-sectional part (reaches a limit) while undergoing buckling deformation. In this case, the collision energy cannot be efficiently absorbed, and the amount of collision energy absorbed by the rocker may decrease.

For this reason, in the above configuration, the horizontal plate is disposed in the middle of the closed cross-sectional part in the vehicle-height direction. Thus, the horizontal plate is prevented from being partially left uncrushed by hitting the upper wall or the lower wall of the closed cross-sectional part, and thereby reaching a limit, while undergoing buckling deformation.

The above configuration has an excellent advantage of being able to prevent the first vertical plate and the second vertical plate from interfering with deformation of the horizontal plate by not providing the first vertical plate and the second vertical plate at the vertex of the ridge or the vertex of the valley.

In the first aspect, the horizontal plate may have the ridge and the valley provided alternately at a constant amplitude. The ridge may be provided on the side of the horizontal plate closer to the outer wall. The displacement between the vertex of the ridge and a point of intersection between the horizontal plate and the outer wall may be set to be smaller than the amplitude of the horizontal plate.

For example, if the displacement between the vertex of the ridge and the point of intersection between the horizontal plate and the outer wall is large, the horizontal plate undergoes buckling deformation easily. Thus, in this case, the absorption amount of collision energy is small.

In the above configuration, therefore, the horizontal plate is provided with the ridge and the valley formed alternately at a constant amplitude, and the ridge is provided on the side of the horizontal plate closer to the outer wall, and the displacement between the vertex of the ridge and the point of intersection between the horizontal plate and the outer wall is set to be smaller than the amplitude of the horizontal plate. Thus, the horizontal plate does not easily undergo buckling deformation, and the initial load associated with buckling deformation of the horizontal plate is increased.

The above configuration has an excellent advantage of being able to reduce buckling deformability and increase the initial load by setting the displacement between the vertex of the ridge and the point of intersection between the horizontal plate and the outer wall to be smaller than the amplitude of the horizontal plate.

In the first aspect, the first vertical plate may be a lower vertical plate that is propped along the vehicle-height direction between the lower wall and the horizontal plate. The ridge may be formed on the side of the horizontal plate closer to the outer wall, and the lower vertical plate may be provided at a position at which the lower vertical plate intersects with an inflection point between the ridge and the valley.

In this configuration, the first vertical plate is a lower vertical plate propped along the vehicle-height direction between the lower wall and the horizontal plate. The ridge is formed on the side of the horizontal plate closer to the outer wall. Thus, when the horizontal plate undergoes buckling deformation in a lateral collision of the vehicle, an outer wall-side part of the horizontal plate deforms upward with the ridge forming a starting point of the deformation.

In the above configuration, since the lower vertical plate is provided at a position at which the lower vertical plate intersects with the inflection point between the valley and the ridge on the side of the horizontal plate closer to the outer wall, the lower vertical plate is subjected to a load in a tensile direction when the outer wall-side part of the horizontal plate undergoes buckling deformation. Thus, it is possible to suppress buckling deformation of the lower vertical plate, as well as to increase the load-carrying capacity of the rocker and increase the amount of collision energy absorbed as the rocker undergoes buckling deformation.

The above configuration has an excellent advantage of being able to increase the load-carrying capacity and increase the amount of collision energy absorbed as the rocker undergoes buckling deformation.

In the first aspect, the horizontal plate may have a plurality of the ridges and a plurality of the valleys; and at least some of the ridges and the valleys may be provided alternately along the vehicle width direction.

In the first aspect, a plurality of the first vertical plates and a plurality of the second vertical plates may be propped respectively; and at least some of the first vertical plates and the second vertical plates may be provided alternately along the vehicle width direction.

A second aspect of the present disclosure is a rocker structure. The rocker structure includes: a closed cross-sectional part that extends along a vehicle front-rear direction on the outer side of a floor panel of a vehicle in a vehicle width direction, and shows a closed cross-section when cut along the vehicle width direction; and a horizontal plate that is provided inside the closed cross-sectional part so as to be propped along the vehicle width direction between the outer wall and the inner wall, and is joined to the outer wall and the inner wall. The closed cross-sectional part includes an outer wall located on the outer side of the closed cross-sectional part in the vehicle width direction, the inner wall located on the inner side of the closed cross-sectional part in the vehicle width direction, a lower wall located on the lower side of the closed cross-sectional part in a vehicle-height direction, and an upper wall located on the upper side of the closed cross-sectional part in the vehicle-height direction. The horizontal plate includes a first fragile portion having low strength on the lower side in the vehicle-height direction, and a second fragile portion having low strength on the upper side in the vehicle-height direction, and the first fragile portion and the second fragile portion are arranged adjacent to each other in the vehicle width direction.

According to the second aspect, it is possible to increase the collision energy absorption efficiency by stabilizing buckling deformation of the rocker, as well as to increase the amount of collision energy absorbed as the rocker undergoes buckling deformation by increasing the load-carrying capacity of the rocker.

In the second aspect, the rocker structure may include a first vertical plate. The first vertical plate may be provided inside the closed cross-sectional part so as to be propped along the vehicle-height direction between the horizontal plate and one of the lower wall and the upper wall, and may be joined to the horizontal wall and the one of the lower wall and the upper wall.

In the second aspect, the rocker structure may include a second vertical plate. The second vertical plate may be propped along the vehicle-height direction between the horizontal plate and the other one of the lower wall and the upper wall, at a position at which the second vertical plate does not coincide with the first vertical plate in the vehicle width direction as seen in a plan view of the horizontal plate, and may be joined to the horizontal plate and the other one of the lower wall and the upper wall.

In the second aspect, the first vertical plate and the second vertical plate may be arranged adjacent to each other in the vehicle width direction. A first area and a second area are adjacent to each other in the horizontal plate along the vehicle width direction, each of the first area and the second area is an area between a vertex of the first fragile portion and a vertex of the second fragile portion adjacent to the vertex of the first fragile portion in the horizontal plate, and the first vertical plate is provided in the first area and the second vertical plate is provided in the second area.

In the second aspect, the horizontal plate may have a plurality of the first fragile portions and a plurality of the second fragile portions, and at least some of the first fragile portions and the second fragile portions may be provided alternately along the vehicle width direction.

In the second aspect, the horizontal plate may be disposed in the middle of the closed cross-sectional part in the vehicle-height direction.

In the second aspect, the horizontal plate may have the first fragile portion and the second fragile portion provided alternately at a constant amplitude. The first fragile portion may be provided on the side of the horizontal plate closer to the outer wall. The displacement between the vertex of the first fragile portion and a point of intersection between the horizontal plate and the outer wall may be set to be smaller than the amplitude of the horizontal plate.

In the second aspect, the first vertical plate may be a lower vertical plate that is propped along the vehicle-height direction between the lower wall and the horizontal plate. The first fragile portion may be provided on the side of the horizontal plate closer to the outer wall, and the lower vertical plate may be provided at a position at which the lower vertical plate intersects with an inflection point between the first fragile portion and the second fragile portion.

In the second aspect, a plurality of the first vertical plates and a plurality of the second vertical plates may be provided between the vertex of the first fragile portion and the vertex of the second fragile portion in the horizontal plate, and at least some of the first vertical plates and the second vertical plates are provided alternately along the vehicle width direction.

In the second aspect, the first fragile portion may be a ridge protruding upward in the vehicle-height direction, and the second fragile portion may be a valley depressed downward in the vehicle-height direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
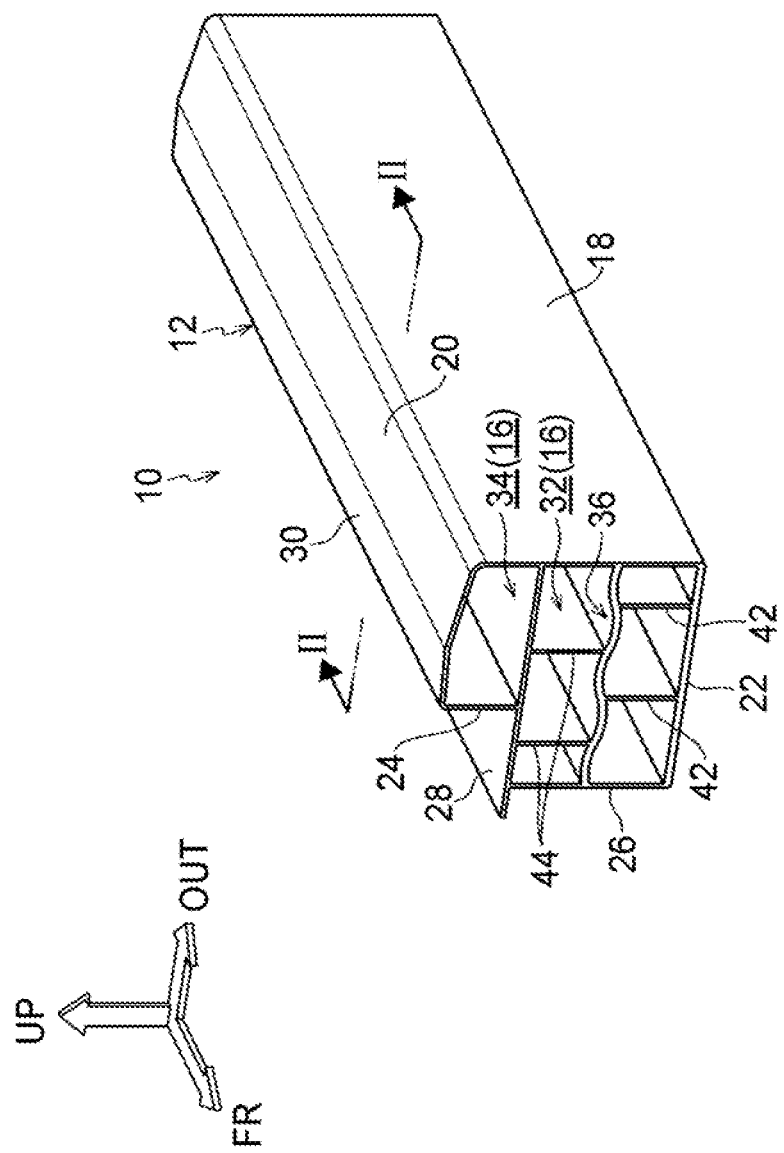
FIG. 1 is a perspective view of a rocker to which a rocker structure according to an embodiment is applied.

A rocker structure according to an embodiment of the present disclosure will be described based on the drawings. The arrows FR, UP, and OUT shown as necessary in the drawings respectively indicate a direction toward a vehicle front side, a direction toward a vehicle upper side, and a direction toward an outer side in a vehicle width direction, in a rocker to which the rocker structure according to an embodiment of the present disclosure is applied. Unless otherwise noted, directions referred to simply as front and rear sides, upper and lower sides, and left and right sides in the following description respectively mean front and rear sides in a vehicle front-rear direction, upper and lower sides in a vehicle-height direction, and left and right sides as seen in a direction toward the front side.

Configuration of Rocker Structure

First, the configuration of the rocker structure according to the embodiment will be described. FIG. 1 is a perspective view of a rocker 10 to which the rocker structure according to the embodiment is applied.

A floor panel (not shown) extends at a lower part of a vehicle along the vehicle width direction and the vehicle front-rear direction. On the lower side of the floor panel, for example, a battery pack (rechargeable battery) formed by lithium-ion batteries, nickel-metal hydride batteries, or the like is installed as a driving force supply device that supplies electricity to a power unit, such as a motor. In place of the battery pack, a hydrogen tank (fuel cell) may be installed.

Figure 2:
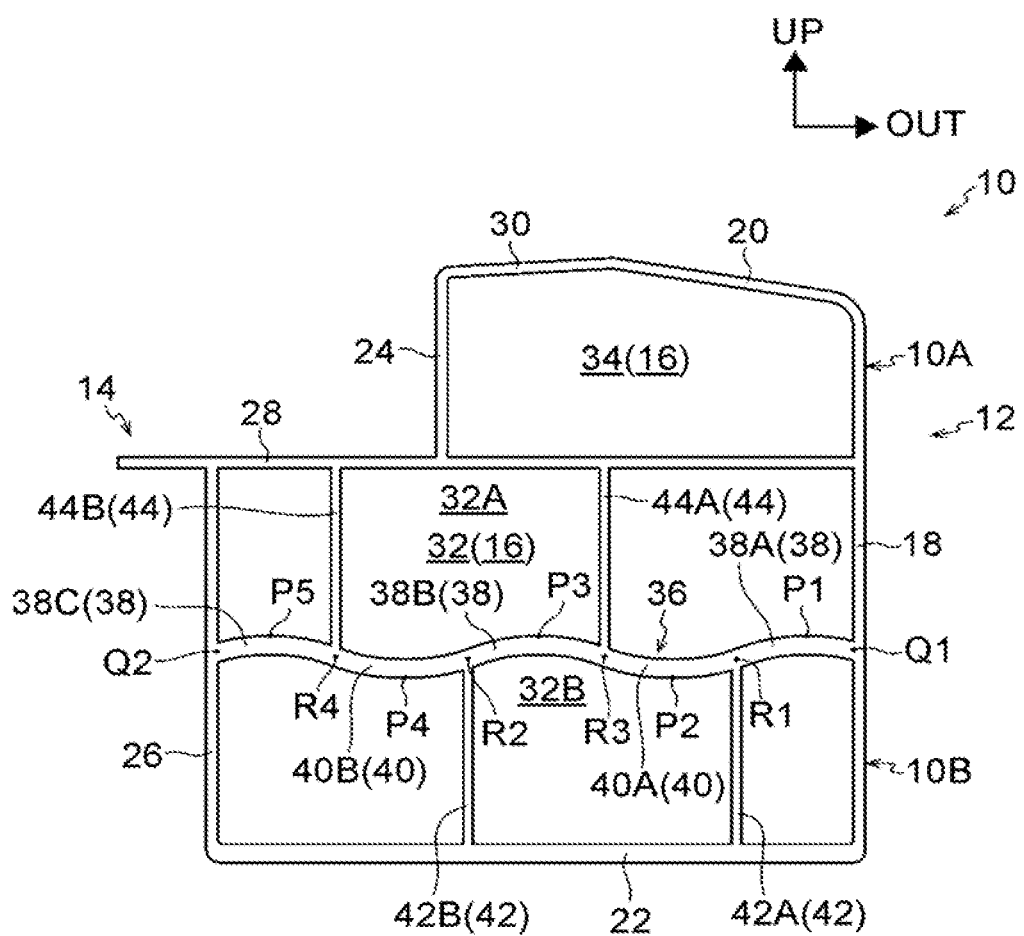
FIG. 2 is a sectional view of the rocker cut along line II-II in FIG. 1.

The rocker 10 extends along the vehicle front-rear direction at each end of the floor panel in the vehicle width direction. As shown in FIG. 2, the rocker 10 includes an outer part 12 located on the outer side in the vehicle width direction and an inner part 14 located on the inner side in the vehicle width direction.

For example, the rocker 10 is made of metal, such as aluminum alloy. The outer part 12 and the inner part 14 are integrally formed by extrusion, drawing, etc., and a closed cross-sectional part 16 is formed by the outer part 12 and the inner part 14. However, it is not essential to integrally form the outer part 12 and the inner part 14. For example, the outer part 12 and the inner part 14 may be joined together by welding or fastening so as to be integrated.

In a cross-sectional shape of the outer part 12 cut along the vehicle width direction, the outer part 12 includes an outer wall 18 that is formed along the height direction, an inclined upper wall 20 that is connected to an upper end of the outer wall 18 and inclined upward while extending toward the inner side in the vehicle width direction, and a portion of a lower wall 22 that is connected to a lower end of the outer wall 18 and located on the lower side of the closed cross-sectional part 16.

In a cross-sectional shape of the inner part 14 cut along the vehicle width direction, the inner part 14 includes an upper inner wall 24 that is formed along the height direction on the upper side of the inner part 14, and a lower inner wall (inner wall) 26 that is formed along the vehicle-height direction on the lower side of the inner part 14.

The lower inner wall 26 is located farther on the inner side in the vehicle width direction than the upper inner wall 24, and a horizontal wall 28 formed along a substantially horizontal direction is provided between an upper end of the lower inner wall 26 and a lower end of the upper inner wall 24. The horizontal wall 28 extends from the upper inner wall 24 toward the closed cross-sectional part 16 and is connected to the outer wall 18 of the outer part 12, and the rocker 10 is thereby divided into an upper part 10A and a lower part 10B.

An inclined upper wall 30 that is gently inclined upward while extending toward the outer side in the vehicle width direction is connected to an upper end of the upper inner wall 24, and the inclined upper wall 30 is formed so as to be connected to the inclined upper wall 20 of the outer part 12. Another portion of the lower wall 22 located on the lower side of the closed cross-sectional part 16 is connected to a lower end of the lower inner wall 26.

The upper inner wall 24 of the inner part 14 is located farther on the outer side in the vehicle width direction than the lower inner wall 26 as described above, so that the area of the closed cross-sectional part differs between the upper part 10A and the lower part 10B of the rocker 10. Specifically, the area of a lower closed cross-sectional part 32 provided on the side of the lower part 10B of the rocker 10 is larger than the area of an upper closed cross-sectional part 34 provided on the side of the upper part 10A of the rocker 10, and the rigidity of the rocker 10 is higher on the side of the lower part 10B than on the side of the upper part 10A.

In this embodiment, a horizontal plate 36 is provided substantially in the middle of the lower closed cross-sectional part 32 in the vehicle-height direction, so as to be propped along the vehicle width direction between the outer wall 18 of the outer part 12 and the lower inner wall 26 of the inner part 14. Thus, the lower closed cross-sectional part 32 is further divided by the horizontal plate 36 into a closed cross-sectional part 32A and a closed cross-sectional part 32B. The horizontal plate 36 may be joined to the outer wall 18 and the lower inner wall 26.

Figure 3:
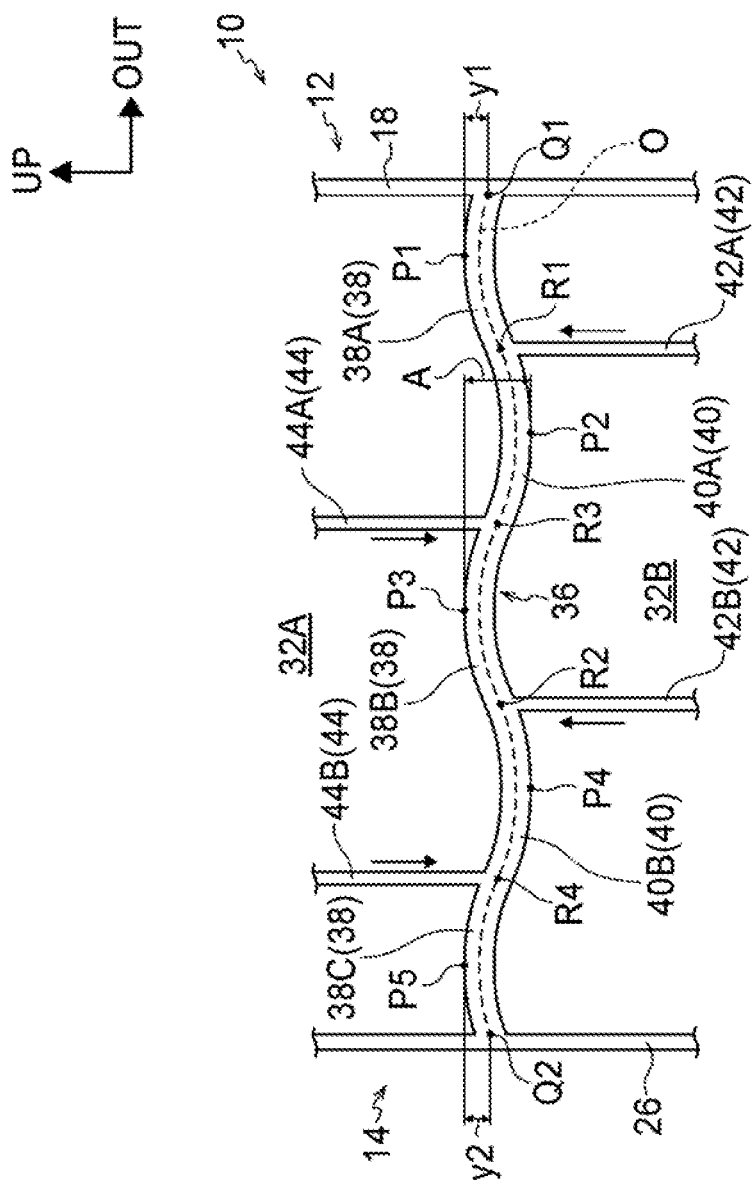
FIG. 3 is an enlarged partial sectional view showing a close-up of a part of FIG. 2.

Here, as shown in FIG. 3, the horizontal plate 36 has a corrugated shape. The horizontal plate 36 has ridges 38 protruding upward and valleys 40 depressed downward that are formed alternately and continuously along the vehicle width direction while the plate thickness of the horizontal plate 36 remains substantially constant. Thus, the horizontal plate 36 is corrugated with a substantially constant amplitude and a substantially constant frequency of waves.

To go into more detail, in this embodiment, the horizontal plate 36 has a ridge 38A, a valley 40A, a ridge 38B, a valley 40B, and a ridge 38C formed continuously in this order from the side of the outer wall 18. The vertices of the ridge 38A, the valley 40A, the ridge 38B, the valley 40B, and the ridge 38C are referred to as vertices P1, P2, P3, P4, and P5, respectively. Although there are a plurality of ridges 38 and a plurality of valleys 40 in this embodiment, it is not essential that there are a plurality of ridges 38 and a plurality of valleys 40, and there may be, for example, only one ridge 38A and one valley 40A. When there are a plurality of ridges 38 and a plurality of valleys 40, it is not essential that all the ridges 38 and the valleys 40 are alternately and continuously formed, but it suffices that some of the ridges 38 and the valleys 40 are formed alternately and continuously. Note that the description of "the ridges 38 and the valleys 40 are formed alternately" may include not only the meaning that a plurality of ridges 38 and a plurality of valleys 40 are provided alternately in the repeated pattern, but also, for example, the meaning that one ridge 38A and one valley 40A are arranged adjacent to each other in this embodiment.

In this embodiment, a point of intersection Q1 between the horizontal plate 36 and the outer wall 18 is a starting position Q1 of the corrugation of the horizontal plate 36, and a point of intersection Q2 between the horizontal plate 36 and the lower inner wall 26 is an ending position Q2 of the corrugation of the horizontal plate 36. Displacement y1 between the vertex P1 of the ridge 38A and the corrugation starting position Q1 and displacement y2 between the vertex P5 of the ridge 38C and the corrugation ending position Q2 in the horizontal plate 36 are set to be smaller than an amplitude A of the corrugation of the horizontal plate 36.

As shown in FIG. 2 and FIG. 3, a plurality of lower vertical plates (first vertical plates) 42A, 42B is propped between the horizontal plate 36 and the lower wall 22 on the side of the closed cross-sectional part 32B. The lower vertical plates (first vertical plates) 42A, 42B may be joined to the horizontal plate 36 and the lower wall 22. The lower vertical plate 42A is provided at a position at which the lower vertical plate 42A intersects with an inflection point R1 between the ridge 38A and the valley 40A that is provided between the vertex P1 of the ridge 38A and the vertex P2 of the valley 40A in the horizontal plate 36. The lower vertical plate 42B is provided at a position at which the lower vertical plate 42B intersects with an inflection point R2 between the ridge 38B and the valley 40B that is provided between the vertex P3 of the ridge 38B and the vertex P4 of the valley 40B. The inflection points R1, R2 and inflection points R3, R4 to be described later are provided on a neutral axis O of the horizontal plate 36. The ridges 38 protrude upward and the valleys 40 are depressed downward, and therefore the ridges 38 have low strength on the lower side and the valleys 40 have low strength on the upper side. Thus, the ridges 38 and the valleys 40 form fragile portions in the horizontal plate 36. For example, the ridge 38A has low strength on the lower side of the horizontal plate 36 from the inflection point R1, and the valley 40A has low strength on the upper side of the horizontal plate 36 from the inflection point R1.

On the other hand, a plurality of upper vertical plates (second vertical plates) 44A, 44B is propped between the horizontal plate 36 and the horizontal wall 28 on the side of the closed cross-sectional part 32A. The upper vertical plates (second vertical plates) 44A, 44B may be joined to the horizontal plate 36 and the horizontal wall 28. The upper vertical plate 44A is provided at a position at which the upper vertical plate 44A intersects with the inflection point R3 between the valley 40A and the ridge 38B that is provided between the vertex P2 of the valley 40A and the vertex P3 of the ridge 38B in the horizontal plate 36. The upper vertical plate 44B is provided at a position at which the upper vertical plate 44B intersects with the inflection point R4 between the valley 40B and the ridge 38C that is provided between the vertex P4 of the valley 40B and the vertex P5 of the ridge 38C.

As has been described above, the lower vertical plates 42 and the upper vertical plates 44 are provided at positions at which these plates do not coincide with each other in the vehicle width direction as seen in a plan view of the horizontal plate 36, and are disposed alternately along the vehicle width direction. The lower vertical plate 42 is provided on the side of the outer wall 18 of the rocker 10.

Workings and Effects of Rocker Structure

Next, the workings and effects of the rocker structure according to the embodiment will be described.

In this embodiment, as shown in FIG. 2 and FIG. 3, the horizontal plate 36 is provided inside the lower closed cross-sectional part 32 of the rocker 10 so as to be propped along the vehicle width direction between the outer wall 18 of the outer part 12 and the lower inner wall 26 of the inner part 14. The horizontal plate 36 has the ridges 38 and the valleys 40 that are formed continuously and alternately along the vehicle width direction.

When the horizontal plate 36 propped between the outer wall 18 and the lower inner wall 26 of the rocker 10 is thus provided inside the lower closed cross-sectional part 32 of the rocker 10, the rigidity of the rocker 10 can be enhanced and deformation of the rocker 10 can be suppressed compared with when the horizontal plate 36 is not provided (this case is not shown). Accordingly, in this embodiment, the load-carrying capacity of the rocker 10 can be increased.

For example, the battery pack (not shown) is installed on the inner side of the pair of rockers 10. In a lateral collision of the vehicle, when a load of the lateral collision is input into the rocker 10, the collision energy is absorbed as the rocker 10 undergoes plastic deformation (buckling deformation) by receiving a reaction force from the battery pack.

In this case, inside the lower closed cross-sectional part 32 of the rocker 10, the horizontal plate 36 undergoes buckling deformation with the ridges 38 and the valleys 40 forming starting points of the deformation. Specifically, the horizontal plate 36 becomes folded along the vehicle width direction, in the order of the vertex P1 of the ridge 38A, the vertex P2 of the valley 40A, the vertex P3 of the ridge 38B, the vertex P4 of the valley 40B, and the vertex P5 of the ridge 38C, and thus the deformation mode is controlled. This means that the buckling deformation of the horizontal plate 36 is stabilized and the collision energy absorption efficiency can be increased.

Moreover, in this embodiment, the lower vertical plates 42 are provided inside the lower closed cross-sectional part 32 so as to be propped along the vehicle-height direction between the horizontal plate 36 and the lower wall 22 located on the lower side of the lower closed cross-sectional part 32. Thus, the horizontal plate 36 is reinforced and wobbling thereof in the vehicle-height direction is suppressed.

As a result, in this embodiment, the plate thickness of the horizontal plate 36 can be made relatively small and a weight reduction of the rocker 10 can be thereby achieved. Moreover, in this embodiment, the rigidity of the rocker 10 can be enhanced and deformation of the rocker 10 can be suppressed compared with when the lower vertical plates 42 are not provided (this case is not shown). Thus, in this embodiment, the load-carrying capacity of the rocker 10 can be increased.

Thus, in this embodiment, it is possible to increase the collision energy absorption efficiency by stabilizing the buckling deformation of the rocker 10, as well as to increase the amount of collision energy absorbed as the rocker 10 undergoes buckling deformation by increasing the load-carrying capacity of the rocker 10. In other words, the rocker structure of the embodiment can stabilize buckling deformation and increase the absorption amount of collision energy.

In this embodiment, the upper vertical plates 44 are provided inside the lower closed cross-sectional part 32 so as to be propped along the vehicle-height direction between the horizontal wall 28 and the horizontal plate 36 in the lower closed cross-sectional part 32. The upper vertical plates 44 are provided at positions at which the upper vertical plates 44 do not coincide with the lower vertical plates 42 in the vehicle width direction as seen in a plan view of the horizontal plate 36.

In this embodiment, the horizontal plate 36 is reinforced by the upper vertical plates 44 being provided inside the lower closed cross-sectional part 32 so as to be propped between the horizontal plate 36 and the horizontal wall 28 located on the upper side of the lower closed cross-sectional part 32. In this embodiment, it is possible to enhance the rigidity of the rocker 10 and suppress deformation of the rocker 10 compared with when the upper vertical plates 44 (see FIG. 3) are not provided (this case is not shown). Thus, it is possible to increase the load-carrying capacity of the rocker 10 and increase the amount of collision energy absorbed as the rocker 10 undergoes buckling deformation.

Moreover, the upper vertical plates 44 are provided at positions at which the upper vertical plates 44 do not coincide with the lower vertical plates 42 in the vehicle width direction as seen in a plan view of the horizontal plate 36. Thus, when the horizontal plate 36 undergoes buckling deformation with the ridges 38 and the valleys 40 forming starting points of the deformation, the upper vertical plates 44 or the lower vertical plates 42 do not interfere with the deformation of the horizontal plate 36.

As a comparative example, if, for example, the upper vertical plates 44 and the lower vertical plates 42 are provided at positions at which these plates coincide with each other in the vehicle width direction as seen in a plan view of the horizontal plate 36 (this case is not shown), when the horizontal plate 36 undergoes buckling deformation with the ridges 38 and the valleys 40 forming starting points of the deformation, the upper vertical plates 44 or the lower vertical plates 42 may interfere with the deformation of the horizontal plate 36 by exerting tension in the direction of deformation of the horizontal plate 36. For this reason, in this embodiment, the upper vertical plates 44 are placed so as not to coincide with the lower vertical plates 42 in the vehicle width direction as seen in a plan view of the horizontal plate 36 as described above.

Moreover, in this embodiment, the lower vertical plates 42 and the upper vertical plates 44 are provided alternately along the vehicle width direction, between the ridge 38 and the valley 40 and between the valley 40 and the ridge 38 in the horizontal plate 36. When the horizontal plate 36 undergoes buckling deformation, the horizontal plate 36 deforms with the vertices P1, P3, P5 of the ridges 38 and the vertices P2, P4 of the valleys 40 forming starting points of the deformation. Therefore, the lower vertical plates 42 and the upper vertical plates 44 are not provided at positions at which these plates intersect with the vertices P1, P3, P5 of the ridges 38 and the vertices P2, P4 of the valley 40. Thus, interference with deformation of the horizontal plate 36 is prevented. Although there are the lower vertical plates 42 and the upper vertical plates 44 in this embodiment, it is not essential that there are the lower vertical plates 42 and the upper vertical plates 44, and there may be, for example, only one the lower vertical plate 42A and one the upper vertical plate 44A. When there are the lower vertical plates 42 and the upper vertical plates 44, it is not essential that all the lower vertical plates 42 and the upper vertical plates 44 are alternately and continuously provided, but it suffices that some of the lower vertical plates 42 and the upper vertical plates 44 are provided alternately and continuously. Note that the description of "the lower vertical plates 42 and the upper vertical plates 44 are provided alternately" may include not only the meaning that the lower vertical plates 42 and the upper vertical plates 44 are provided alternately in the repeated pattern, but also, for example, the meaning that one the lower vertical plate 42A and one the upper vertical plate 44A are arranged adjacent to each other in this embodiment.

Figure 6A:
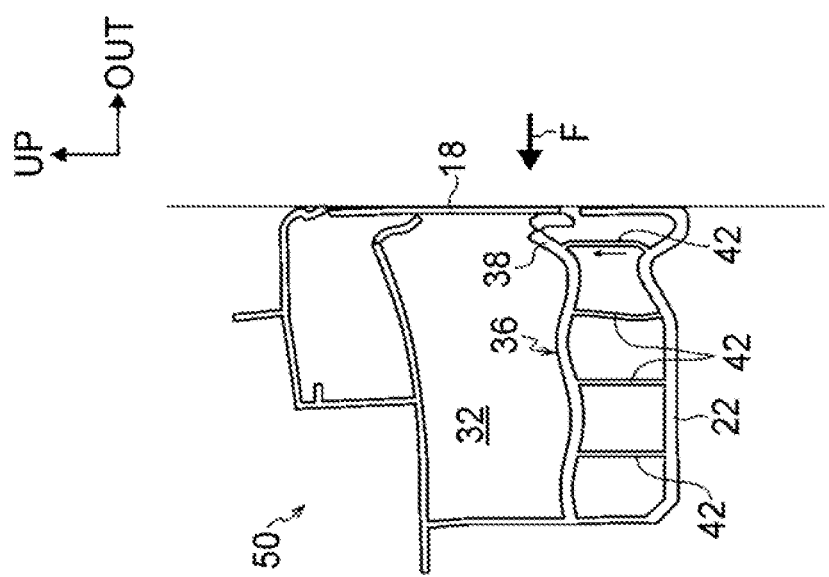
FIG. 6A is a schematic view showing, in chronological order, a state where a lateral collision load is input into the rocker to which the rocker structure according to the embodiment is applied.

In this embodiment, the horizontal plate 36 is disposed substantially in the middle of the lower closed cross-sectional part 32 in the vehicle-height direction. For example, as shown in FIG. 6A, the horizontal plate 36 is provided on the lower side of the lower closed cross-sectional part 32 in the vehicle-height direction in a rocker 50. In this case, the horizontal plate 36 will be partially left uncrushed if the horizontal plate 36 hits the lower wall 22 of the lower closed cross-sectional part 32 (reaches a limit) while undergoing buckling deformation. As a result, collision energy cannot be efficiently absorbed, and the amount of collision energy absorbed by the rocker 10 may be reduced.

For this reason, in this embodiment, the horizontal plate 36 is disposed in the middle of the lower closed cross-sectional part 32 as shown in FIG. 2 and FIG. 3. This makes it less likely that the horizontal plate 36 is partially left uncrushed by hitting the horizontal wall 28 or the lower wall 22 of the lower closed cross-sectional part 32, and thereby reaching a limit, while undergoing buckling deformation. As will be described later, it is not essential to dispose the horizontal plate 36 in the middle of the lower closed cross-sectional part 32.

In this embodiment, the horizontal plate 36 has the ridges 38 and the valleys 40 formed alternately at the constant amplitude A. The ridge 38 is provided on the side of the horizontal plate 36 closer to the outer wall 18, and the displacement y1 between the vertex P1 of the ridge 38A and the point of intersection Q1 between the horizontal plate 36 and the outer wall 18 is set to be smaller than the amplitude A of the horizontal plate 36.

As a comparative example, if, for example, the displacement between the vertex P1 of the ridge 38A and the point of intersection Q1 between the horizontal plate 36 and the outer wall 18 is large (this case is not shown), the horizontal plate 36 undergoes buckling deformation easily. Thus, in this case, the absorption amount of collision energy is small.

In this embodiment, therefore, as described above, the displacement y1 between the vertex P1 of the ridge 38A and the point of intersection Q1 between the horizontal plate 36 and the outer wall 18 is set to be smaller than the amplitude A of the horizontal plate 36. Thus, the horizontal plate 36 does not easily undergo buckling deformation, and the initial load associated with buckling deformation of the horizontal plate 36 is increased.

Moreover, in this embodiment, the ridge 38 is formed on the side of the horizontal plate 36 closer to the outer wall 18 in the rocker 10. Thus, when the horizontal plate 36 undergoes buckling deformation in a lateral collision of the vehicle, a part of the horizontal plate 36 on the side closer to the outer wall 18 deforms upward with the ridge 38 of the horizontal plate 36 forming a starting point of the deformation.

In this embodiment, since the lower vertical plate 42A is provided between the valley 40A and the ridge 38A on the side of the horizontal plate 36 closer to the outer wall 18, the lower vertical plate 42A is subjected to a load in a tensile direction (arrow direction) when the part of the horizontal plate 36 on the side closer to the outer wall 18 undergoes buckling deformation with the vertex P1 of the ridge 38A forming a starting point of the deformation. Thus, buckling deformation of the lower vertical plate 42A is suppressed, and the load-carrying capacity of the rocker 10 can be increased and the amount of collision energy absorbed as the rocker 10 undergoes buckling deformation can be increased.

Like the lower vertical plate 42A, the upper vertical plate 44A is provided between the valley 40A and the ridge 38B in the horizontal plate 36. Thus, when the horizontal plate 36 undergoes buckling deformation with the vertex P2 of the valley 40A in the horizontal plate 36 forming a starting point of the deformation, the upper vertical plate 44A is subjected to a load in a tensile direction (arrow direction).

In this embodiment, the lower vertical plate 42A is provided at the position at which the lower vertical plate 42A intersects with the inflection point R1 between the ridge 38A and the valley 40A, and the lower vertical plate 42B is provided at the position at which the lower vertical plate 42B intersects with the inflection point R2 between the ridge 38B and the valley 40B. The inflection points R1, R2 are provided on the neutral axis O of the horizontal plate 36. The inflection points R1, R2 are located in the middle of the height of the corrugation of the horizontal plate 36, and the inflection points R1, R2 form points of intersection of the neutral axis O of the horizontal plate 36.

No moment occurs on the neutral axis O of the horizontal plate 36. Therefore, by providing the lower vertical plates 42A, 42B on the neutral axis O, it is possible to minimize the plate thickness of the lower vertical plates 42A, 42B, and thereby achieve a weight reduction, without imposing an excessive load on the lower vertical plates 42A, 42B. The upper vertical plates 44A, 44B have substantially the same effect as the lower vertical plates 42A, 42B.

The lower vertical plate 42B is provided between the ridge 38B and the valley 40B in the horizontal plate 36. Thus, when the horizontal plate 36 undergoes buckling deformation with the vertex P3 of the ridge 38B of the horizontal plate 36 forming a starting point of the deformation, the lower vertical plate 42B is subjected to a load in a tensile direction (arrow direction).

Moreover, the upper vertical plate 44B is provided between the valley 40B and the ridge 38C in the horizontal plate 36. Thus, when the horizontal plate 36 undergoes buckling deformation with the vertex P4 of the valley 40B of the horizontal plate 36 forming a starting point of the deformation, the upper vertical plate 44B is subjected to a load in a tensile direction (arrow direction).

While the ridge 38 is formed on the side of the horizontal plate 36 closer to the outer wall 18 in this embodiment, the valley 40 may instead be formed there. In this case, the positions of the lower vertical plates 42 and the positions of the upper vertical plates 44 are reversed in the height direction.

Supplement to Embodiment

According to the above embodiment, the horizontal plate 36 shown in FIG. 2 and FIG. 3 is provided with the lower vertical plates 42 and the upper vertical plates 44. However, the present disclosure should at least be able to stabilize buckling deformation and increase the absorption amount of collision energy. Thus, it is not necessary to meet all the specifications of the configuration of the above embodiment.

For example, the lower vertical plates 42 and the upper vertical plates 44 are provided in FIG. 2 and FIG. 3. However, from the viewpoint of reinforcing the horizontal plate 36, it suffices that only either of the lower vertical plates 42 and the upper vertical plates 44 be provided. Thus, as shown in FIG. 4, for example, the lower vertical plates 42 may be propped between the horizontal plate 36 and the lower wall 22 on the side of the closed cross-sectional part 32B of the rocker 50.

Figure 5:
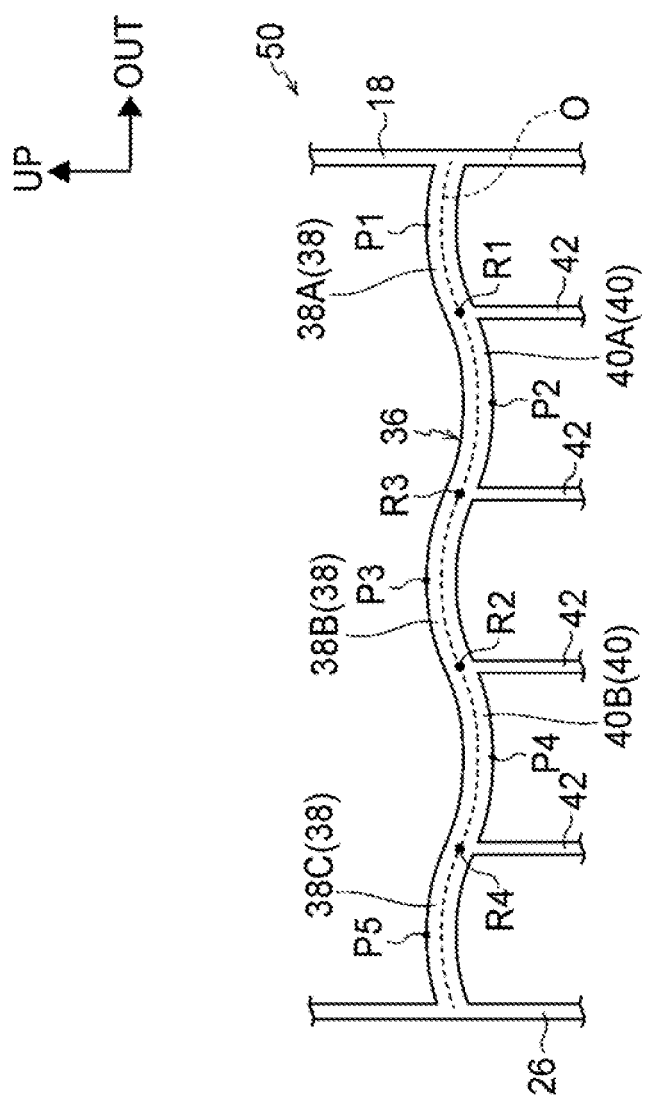
FIG. 5 is an enlarged partial sectional view showing a close-up of a part of FIG. 4.

In this case, as shown in FIG. 5, the lower vertical plate 42 is provided in the horizontal plate 36 not only at positions at which the lower vertical plate 42 intersects with the inflection point R1 between the ridge 38A and the valley 40A and with the inflection point R2 between the ridge 38B and the valley 40B, but also at positions at which the lower vertical plate 42 intersects with the inflection point R3 between the valley 40A and the ridge 38B and with the inflection point R4 between the valley 40B and the ridge 38C. However, it is of course not essential to provide the lower vertical plate 42 at the inflection points R3, R4.

Figure 4:
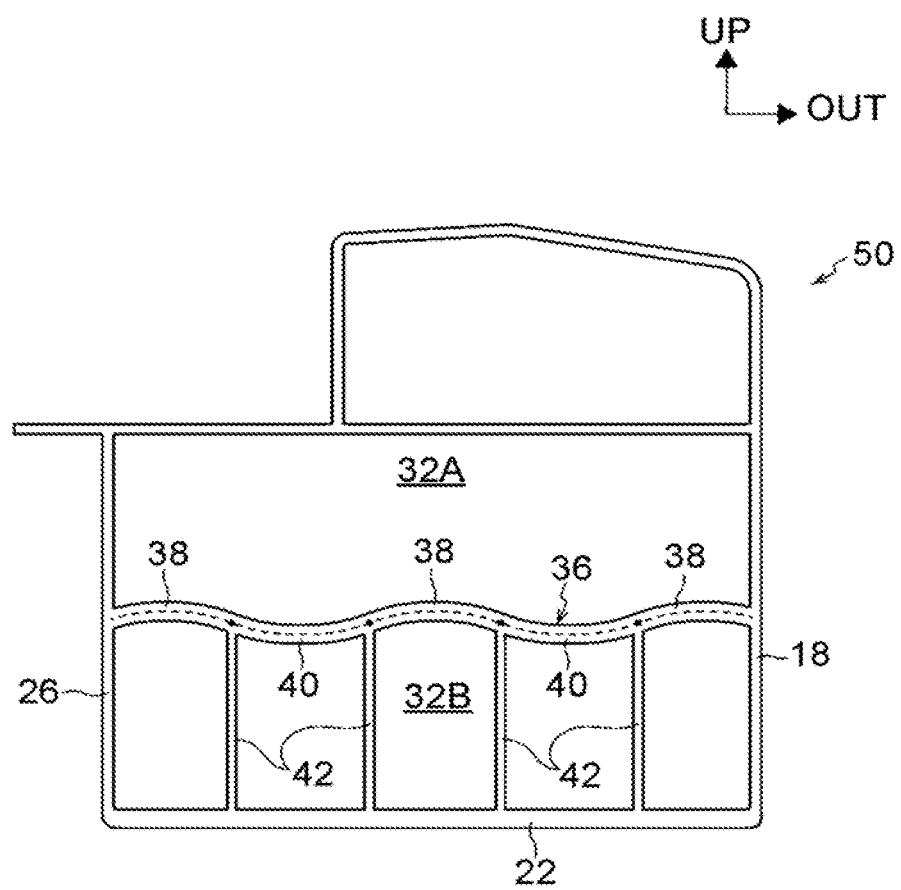
FIG. 4 is a sectional view corresponding to FIG. 2, showing a modified example of the rocker structure according to the embodiment.

While the lower vertical plates 42 are provided in FIG. 4 and FIG. 5, from the viewpoint of stabilizing buckling deformation of the horizontal plate 36 and increasing the collision energy absorption efficiency, the lower vertical plates 42 need not be provided.

Here, FIG. 6A, FIG. 6B, FIG. 7A, and FIG. 7B are schematic sectional views each showing, in chronological order, a state where a lateral collision load F is input into the rocker 50 of a vehicle to which the rocker structure according to the embodiment is applied. Although not shown here, the rocker 10 shown in FIG. 2 and FIG. 3 has substantially the same effect as the rocker 50.

Figure 6B:
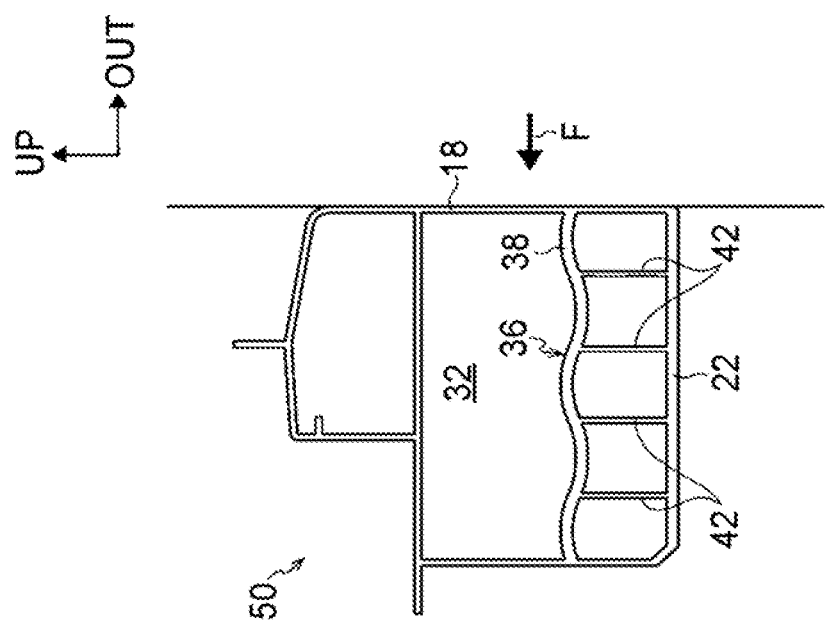
FIG. 6B is a schematic view showing, in chronological order, a state where the lateral collision load is input into the rocker to which the rocker structure according to the embodiment is applied.

FIG. 6A shows a state immediately before the lateral collision load F is input into the rocker 50. As shown in FIG. 6B, when the lateral collision load F is input into the rocker 50, a part of the horizontal plate 36 on the side closer to the outer wall 18 deforms upward with the ridge 38 forming a starting point of the deformation.

Accordingly, the lower vertical plate 42 is subjected to a load in a tensile direction (arrow direction), and the load-carrying capacity of the horizontal plate 36 is increased. At the same time, the lower wall 22 of the rocker 50 deforms upward through the lower vertical plate 42. Specifically, the lower wall 22 deforms through the lower vertical plate 42 into a protruding shape corresponding to the shape of the horizontal plate 36.

Figure 7A:
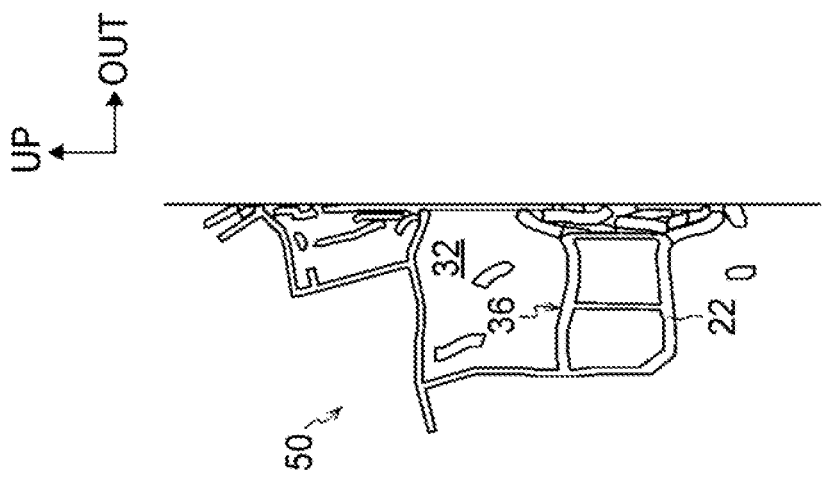
FIG. 7A is a schematic view showing, in chronological order, a state where the lateral collision load is input into the rocker to which the rocker structure according to the embodiment is applied.
Figure 7B:
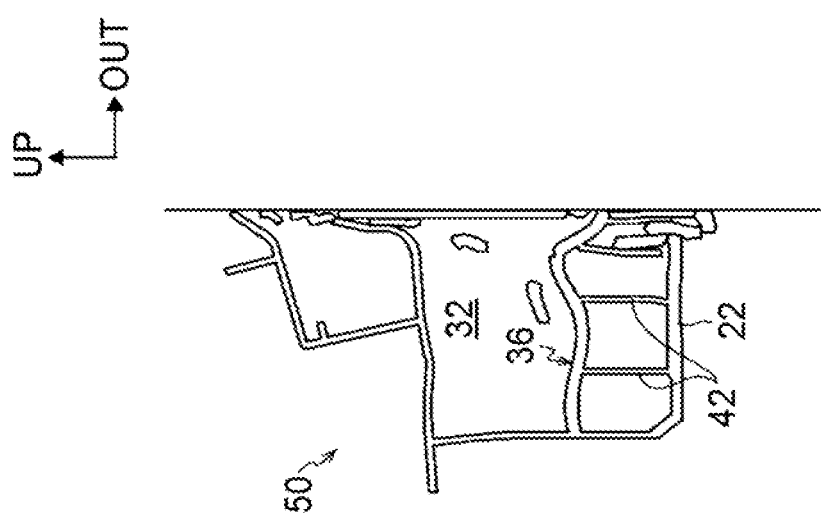
FIG. 7B is a schematic view showing, in chronological order, a state where the lateral collision load is input into the rocker to which the rocker structure according to the embodiment is applied.

As a result, as shown in FIG. 7A and FIG. 7B, the horizontal plate 36 and the lower wall 22 become folded along the vehicle width direction sequentially from the side of the outer wall 18, and thus the deformation mode is controlled. This means that, as with the rocker 10 shown in FIG. 2 and FIG. 3, buckling deformation of the rocker 50 is stabilized and the collision energy absorption efficiency can be increased.

Figure 8:
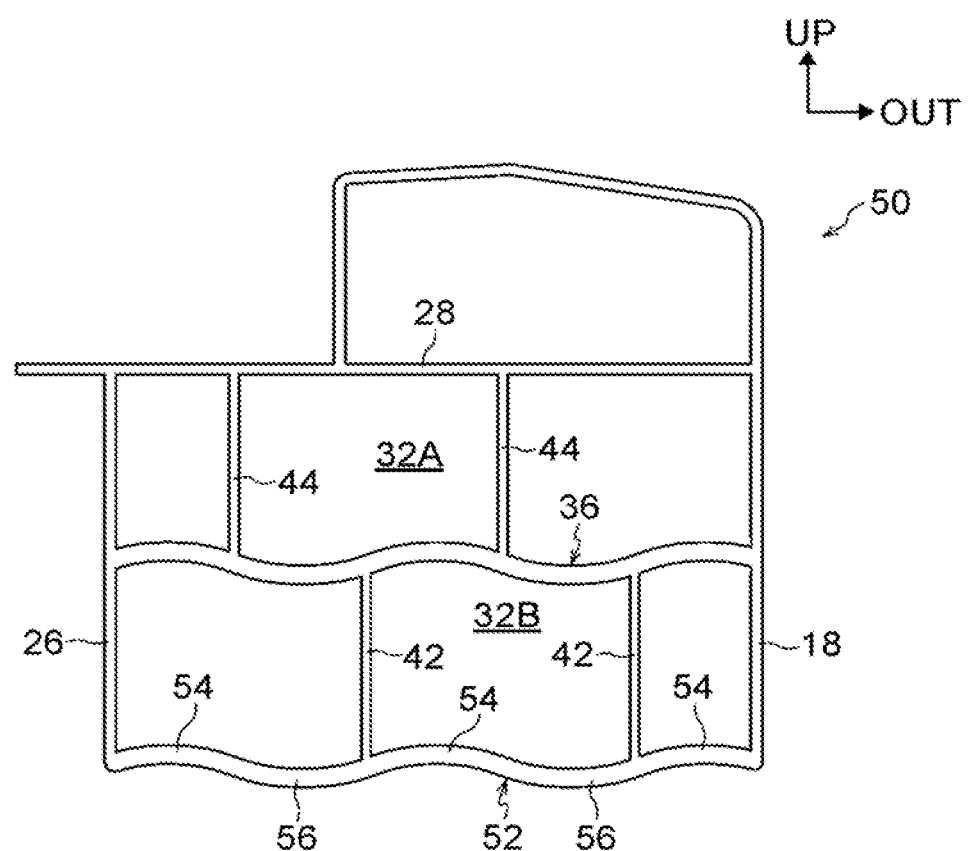
FIG. 8 is a sectional view corresponding to FIG. 2, showing a modified example of the rocker structure according to the embodiment.

The embodiment shown in FIG. 2 and FIG. 3 can achieve the effect that deformation of the horizontal plate 36 causes deformation of the lower wall 22 through the lower vertical plate 42. Alternatively, as shown in FIG. 8, a lower wall 52 may have ridges 54 and valleys 56 that are formed in advance alternately along the vehicle width direction, in substantially the same phase as the ridges and the valleys in the horizontal plate 36. The horizontal wall 28 may also have ridges and valleys formed alternately along the vehicle width direction (this case is not shown here). A plurality of horizontal plates 36 may be formed (this case is not shown).

In the embodiment, the horizontal plate 36 is provided substantially in the middle of the lower closed cross-sectional part 32 in the vehicle-height direction as shown in FIG. 3. However, the present disclosure is not limited to this example. As described above, the rocker 10 absorbs collision energy by receiving a reaction force from the battery pack and undergoing buckling deformation, and therefore it is desirable that the position of the horizontal plate 36 be set at a level at which the horizontal plate 36 can effectively receive this reaction force.

For example, in the rocker 50 shown in FIG. 6A, the horizontal plate 36 is provided on the lower side, rather than in the middle, of the lower closed cross-sectional part 32 in the vehicle-height direction. The lower vertical plates 42 are propped between the horizontal plate 36 and the lower wall 22 of the rocker 50. In this case, the length of the lower vertical plates 42 can be made shorter than the length of the lower vertical plates 42 shown in FIG. 2.

When the length of the lower vertical plates 42 is thus reduced, the weight of the lower vertical plates 42 can be reduced accordingly. Moreover, when the horizontal plate 36 is provided on the lower side, rather than in the middle, of the lower closed cross-sectional part 32 in the vehicle-height direction and then the lower vertical plates 42 are provided, the center of gravity of the rocker 50 can be set to be farther on the lower side than that of the rocker 10 shown in FIG. 2. Thus, the operation stability of the vehicle while running can be improved.

When the length of the lower vertical plate 42 is reduced, the separation distance between the horizontal plate 36 and the lower wall 22 is reduced accordingly. Therefore, to reduce the likelihood that the horizontal plate 36 reaches a limit at an initial stage after an input of a lateral collision load, the ridge 38 is formed on the side of the horizontal plate 36 closer to the outer wall 18 such that the horizontal plate 36 undergoes buckling deformation toward the side of the lower closed cross-sectional part 32 on which the cross-sectional area is larger.

In the embodiment, the horizontal plate 36 has a corrugated shape as shown in FIG. 3. However, the shape of the horizontal plate 36 in the present disclosure is not limited to this example, as long as ridges and valleys are formed alternately along the vehicle width direction.

Figure 9A:
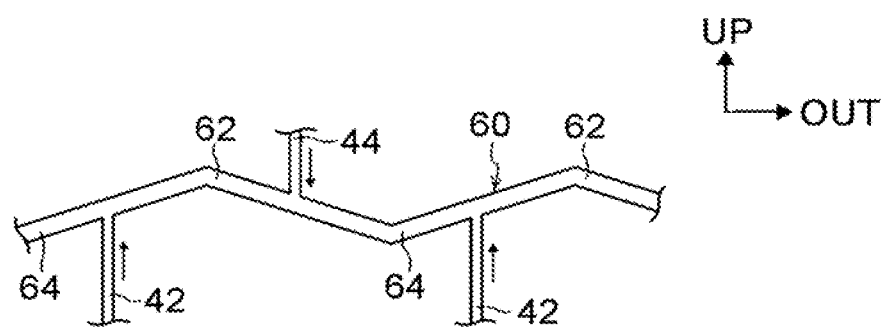
FIG. 9A is an enlarged sectional view of a main part showing a modified example of the rocker structure according to the embodiment.
Figure 9B:
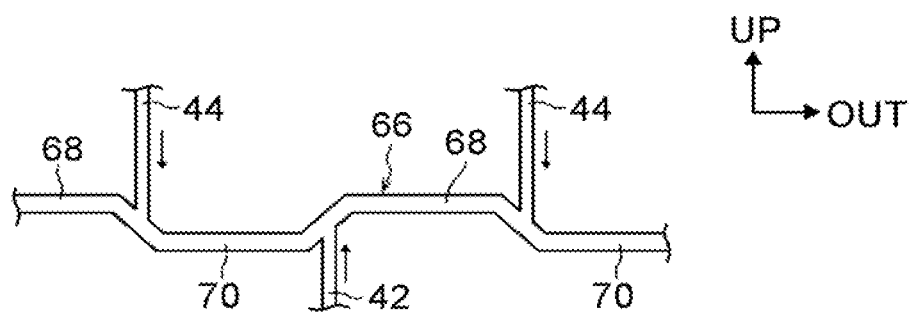
FIG. 9B is an enlarged sectional view of a main part showing a modified example of the rocker structure according to the embodiment.

For example, as shown in FIG. 9A, a horizontal plate 60 may have triangular ridges 62 and valleys 64 so as to form a serrated cross-section, and the ridges 62 and the valleys 64 may be formed alternately along the vehicle width direction. As shown in FIG. 9B, a horizontal plate 66 may have ridges 68 and valleys 70 having trapezoidal cross-sections, and the ridges 68 and the valleys 70 may be formed alternately along the vehicle width direction.

Moreover, in the embodiment, the horizontal plate 36 has the ridges 38 and the valleys 40 formed alternately and continuously along the vehicle width direction as shown in FIG. 3. However, it is not essential to continuously form the ridges 38 and the valleys 40.

Figure 10A:
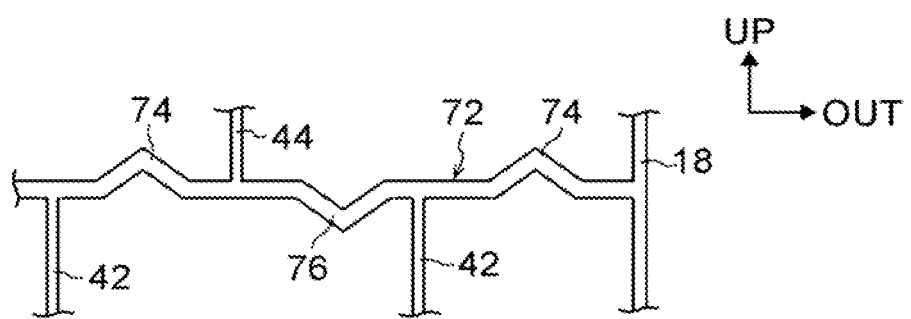
FIG. 10A is an enlarged sectional view of a main part showing a modified example of the rocker structure according to the embodiment.
Figure 10B:
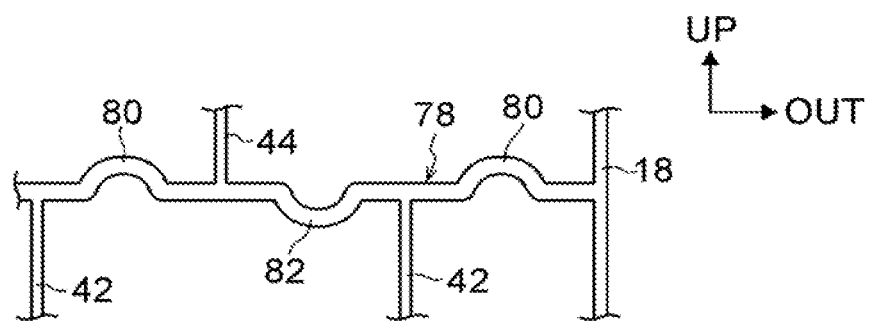
FIG. 10B is an enlarged sectional view of a main part showing a modified example of FIG. 10A.

For example, as shown in FIG. 10A, a horizontal plate 72 formed in a straight shape along the vehicle width direction may have ridges 74 and valleys 76 that have triangular cross-sections and are formed discontinuously and alternately. As shown in FIG. 10B, a horizontal plate 78 formed in a straight shape along the vehicle width direction may have ridges 80 and valleys 82 that have semicircular cross-sections and are formed discontinuously and alternately.

Furthermore, as shown in FIG. 3, the horizontal plate 36 has the ridges 38 and the valleys 40 formed alternately and continuously along the vehicle width direction while the plate thickness of the horizontal plate 36 remains substantially constant in the embodiment. However, the shape of the horizontal plate 36 is not limited to this example, as long as the horizontal plate 36 has a portion that forms a starting point of buckling deformation when the horizontal plate 36 deforms.

Figure 11A:
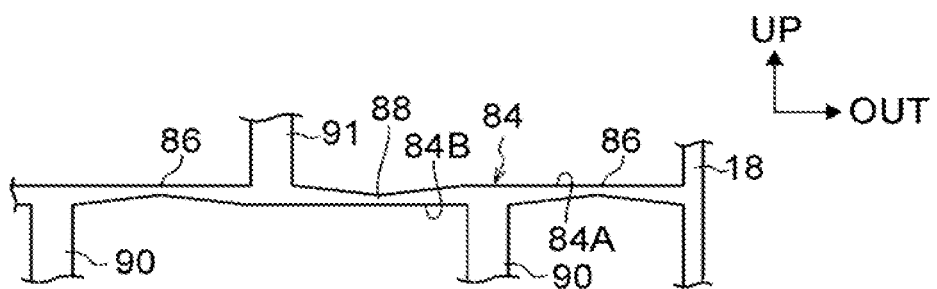
FIG. 11A is an enlarged sectional view of a main part showing a modified example of the rocker structure according to the embodiment.

For example, as shown in FIG. 11A, the plate thickness of a horizontal plate 84 need not be substantially constant along the vehicle width direction. To go into more detail, the horizontal plate 84 has thin portions 86 (ridges) and thin portions 88 (valleys) provided alternately along the vehicle width direction.

Specifically, in this example, in an upper surface 84A and a lower surface 84B defining the plate thickness of the horizontal plate 84, the thin portion 86 is formed by protruding the lower surface 84B upward into a shape defined by flat surfaces, and the thin portion 88 is formed by depressing the upper surface 84A downward into a shape defined by flat surfaces. The thin portions 86, 88 form starting points of buckling deformation when the horizontal plate 84 deforms. In FIG. 11A, the thin portions 86 (ridges) have low strength on the lower side of the horizontal plate 84, and the thin portions 88 (valleys) have low strength on the upper side of the horizontal plate 84.

While lower vertical plates 90 and upper vertical plates 91 in FIG. 11A have a larger plate thickness than the lower vertical plates 42 and the upper vertical plates 44 shown in FIG. 3, the plate thickness of the lower vertical plates 90 and the upper vertical plates 91 can be changed as necessary according to the shape of the horizontal plate 84, set load-carrying capacity thereof, etc.

Figure 11B:
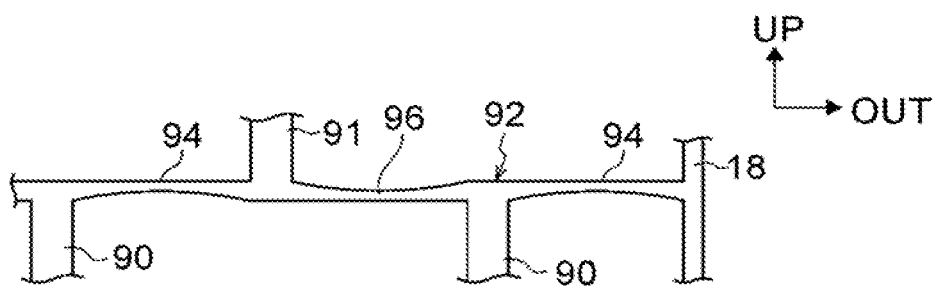
FIG. 11B is an enlarged sectional view of a main part showing a modified example of FIG. 11A.

In this example, the thin portions 86, 88 are formed by protruding or depressing the horizontal plate 84 into shapes defined by flat surfaces. However, the present disclosure is not limited to this example. For example, as with a horizontal plate 92 shown in FIG. 11B, thin portions 94 (ridges) and thin portions 96 (valleys) may be alternately formed by protruding or depressing the horizontal plate 92 into arc shapes. In FIG. 11B, the thin portions 94 (ridges) have low strength on the lower side of the horizontal plate 92, and the thin portions 96 (valleys) have low strength on the upper side of the horizontal plate 92. The horizontal plate 92 (see FIG. 11B) is less likely to develop stress concentration and therefore has higher load-carrying capacity than the horizontal plate 84 (see FIG. 11A).

Figure 12A:
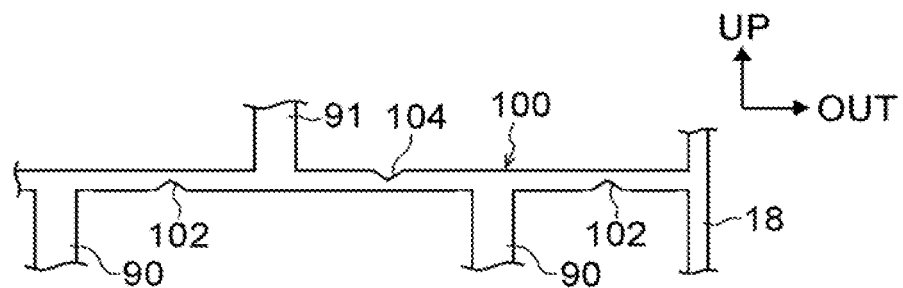
FIG. 12A is an enlarged sectional view of a main part showing a modified example of the rocker structure according to the embodiment.

Another example is shown in FIG. 12A. A horizontal plate 100 may have cutouts 102 (ridges) and cutouts 104 (valleys) that have triangular cross-sections and are formed discontinuously and alternately along the vehicle width direction, at portions that form starting points of buckling deformation when the horizontal plate 100 deforms. In FIG. 12A, the cutouts 102 (ridges) have low strength on the lower side of the horizontal plate 100, and the cutouts 104 (valleys) have low strength on the upper side of the horizontal plate 100.

Figure 12B:
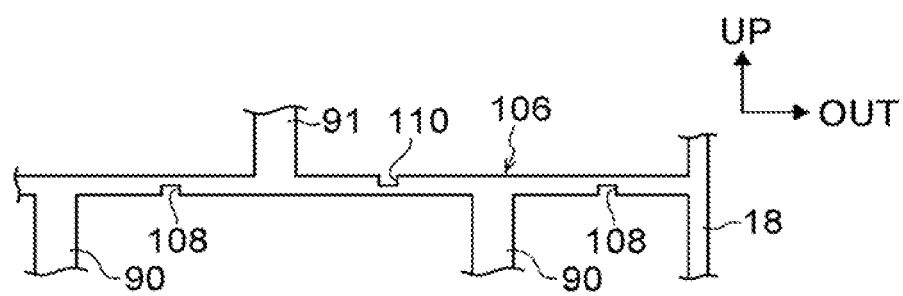
FIG. 12B is an enlarged sectional view of a main part showing a modified example of FIG. 12A.
Figure 12C:
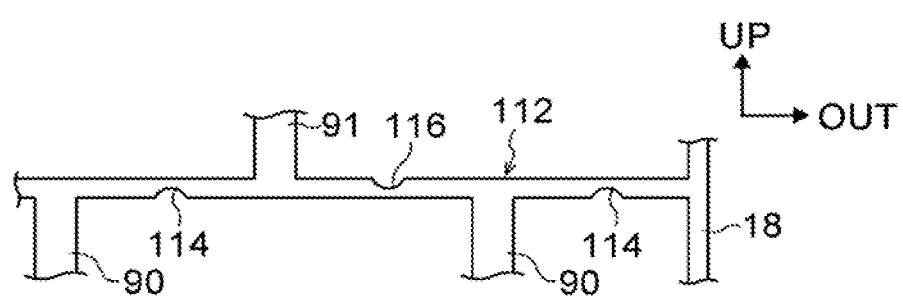
FIG. 12C is an enlarged sectional view of a main part showing a modified example of FIG. 12A.

In this example, as long as cutouts are formed at portions that form starting points of buckling deformation when the horizontal plate 100 deforms, these cutouts are not limited to the cutouts 102, 104 having triangular cross-sections. As with a horizontal plate 106 shown in FIG. 12B, cutouts 108 (ridges) and cutouts 110 (valleys) having substantially U-shaped cross-sections may be provided, or as with a horizontal plate 112 shown in FIG. 12C, cutouts 114 (ridges) and cutouts 116 (valleys) having substantially arc-shaped cross-sections may be provided.

While an example of the embodiment of the present disclosure has been described above, it should be understood that the embodiment of the present disclosure is not limited to this example, and that the present disclosure can be implemented in various aspects within the scope of the gist of the present disclosure, for example, by appropriately combining the embodiment and the various modified examples.

What is claimed is:

1. A rocker structure comprising:
   a closed cross-sectional part that extends along a vehicle front-rear direction on an outer side of a floor panel of a vehicle in a vehicle width direction, the closed cross-sectional part including an outer wall located on an outer side of the closed cross-sectional part in the vehicle width direction, an inner wall located on an inner side of the closed cross-sectional part in the vehicle width direction, a lower wall located on a lower side of the closed cross-sectional part in a vehicle-height direction, and an upper wall located on an upper side of the closed cross-sectional part in the vehicle-height direction;
   a horizontal plate that is provided inside the closed cross-sectional part so as to be propped along the vehicle width direction between the outer wall and the inner wall, and has a ridge protruding upward in the vehicle-height direction and a valley depressed downward in the vehicle-height direction that are provided alternately along the vehicle width direction; and
   a first vertical plate that is provided inside the closed cross-sectional part so as to be propped along the vehicle-height direction between the horizontal plate and one of the lower wall and the upper wall.

2. The rocker structure according to claim 1, further comprising a second vertical plate wherein
   the second vertical plate is propped along the vehicle-height direction between the horizontal plate and the other one of the lower wall and the upper wall, at a position at which the second vertical plate does not coincide with the first vertical plate in the vehicle width direction as seen in a plan view of the horizontal plate.

3. The rocker structure according to claim 2, wherein:
   the first vertical plate and the second vertical plate are provided alternately along the vehicle width direction;
   a first area and a second area are provided alternately in the horizontal plate along the vehicle width direction;
   each of the first area and the second area is an area between a vertex of the ridge and a vertex of the valley adjacent to the vertex of the ridge in the horizontal plate; and
   the first vertical plate is provided in the first area and the second vertical plate is provided in the second area.

4. The rocker structure according to claim 1, wherein the horizontal plate is disposed in a middle of the closed cross-sectional part in the vehicle-height direction.

5. The rocker structure according to claim 1, wherein:
   the horizontal plate has the ridge and the valley provided alternately at a constant amplitude;
   the ridge is provided on a side of the horizontal plate closer to the outer wall; and displacement between a vertex of the ridge and a point of intersection between the horizontal plate and the outer wall is set to be smaller than the amplitude of the horizontal plate.

6. The rocker structure according to claim 1, wherein:
   the first vertical plate is a lower vertical plate that is propped along the vehicle-height direction between the lower wall and the horizontal plate;
   the ridge is provided on a side of the horizontal plate closer to the outer wall; and
   the lower vertical plate is provided at a position at which the lower vertical plate intersects with an inflection point between the ridge and the valley.

7. The rocker structure according to claim 1, wherein:
   the horizontal plate has a plurality of the ridges and a plurality of the valleys; and
   at least some of the ridges and the valleys are provided alternately along the vehicle width direction.

8. The rocker structure according to claim 2, wherein:
   a plurality of the first vertical plates and a plurality of the second vertical plates are propped respectively; and
   at least some of the first vertical plates and the second vertical plates are provided alternately along the vehicle width direction.

9. A rocker structure comprising:
   a closed cross-sectional part that extends along a vehicle front-rear direction on an outer side of a floor panel of a vehicle in a vehicle width direction, and shows a closed cross-section when cut along the vehicle width direction, the closed cross-sectional part including,
      an outer wall located on an outer side of the closed cross-sectional part in the vehicle width direction,
      an inner wall located on an inner side of the closed cross-sectional part in the vehicle width direction,
      a lower wall located on a lower side of the closed cross-sectional part in a vehicle-height direction, and
      an upper wall located on an upper side of the closed cross-sectional part in the vehicle-height direction; and
   a horizontal plate that is provided inside the closed cross-sectional part so as to be propped along the vehicle width direction between the outer wall and the inner wall, and is joined to the outer wall and the inner wall, the horizontal plate including,
      a first fragile portion having low strength on the lower side in the vehicle-height direction, and
      a second fragile portion having low strength on the upper side in the vehicle-height direction, wherein
   the first fragile portion and the second fragile portion are arranged adjacent to each other in the vehicle width direction.

10. The rocker structure according to claim 9, further comprising a first vertical plate that is provided inside the closed cross-sectional part so as to be propped along the vehicle-height direction between the horizontal plate and one of the lower wall and the upper wall, the first vertical plate being joined to the horizontal plate and the one of the lower wall and the upper wall.

11. The rocker structure according to claim 10, further comprising a second vertical plate that is propped along the vehicle-height direction between the horizontal plate and the other one of the lower wall and the upper wall, at a position at which the second vertical plate does not coincide with the first vertical plate in the vehicle width direction as seen in a plan view of the horizontal plate, the second vertical plate being joined to the horizontal plate and the other one of the lower wall and the upper wall.

12. The rocker structure according to claim 11, wherein:
the first vertical plate and the second vertical plate are arranged adjacent to each other along the vehicle width direction;
a first area and a second area are adjacent to each other in the horizontal plate along the vehicle width direction;
each of the first area and the second area is an area between a vertex of the first fragile portion and a vertex of the second fragile portion adjacent to the vertex of the first fragile portion in the horizontal plate; and
the first vertical plate is provided in the first area and the second vertical plate is provided in the second area.

13. The rocker structure according to claim 9, wherein:
the horizontal plate has the first fragile portion and the second fragile portion provided at a constant amplitude;
the first fragile portion is provided on a side of the horizontal plate closer to the outer wall; and displacement between a vertex of the first fragile portion and a point of intersection between the horizontal plate and the outer wall is set to be smaller than the amplitude of the horizontal plate.

14. The rocker structure according to claim 9, wherein the horizontal plate is disposed in a middle of the closed cross-sectional part in the vehicle-height direction.

15. The rocker structure according to claim 9, wherein:
the horizontal plate has a plurality of the first fragile portions and a plurality of the second fragile portions; and
at least some of the first fragile portions and the second fragile portions are provided alternately along the vehicle width direction.

16. The rocker structure according to claim 10, wherein:
the first vertical plate is a lower vertical plate that is propped along the vehicle-height direction between the lower wall and the horizontal plate;
the first fragile portion is provided on a side of the horizontal plate closer to the outer wall; and
the lower vertical plate is provided at a position at which the lower vertical plate intersects with an inflection point between the first fragile portion and the second fragile portion.

17. The rocker structure according to claim 11, wherein:
a plurality of the first vertical plates and a plurality of the second vertical plates are propped respectively; and
at least some of the first vertical plates and the second vertical plates are provided alternately along the vehicle width direction.

18. The rocker structure according to claim 9, wherein the first fragile portion is a ridge protruding upward in the vehicle-height direction, and the second fragile portion is a valley depressed downward in the vehicle-height direction.

* * * * *